United States Patent [19]
Lockhart

[11] Patent Number: 5,618,138
[45] Date of Patent: Apr. 8, 1997

[54] TRUCK PALLET LOCKING DEVICE

[75] Inventor: Donald S. Lockhart, Tulsa, Okla.

[73] Assignee: Mathey/Leland International, Ltd., Broken Arrow, Okla.

[21] Appl. No.: 225,136

[22] Filed: Apr. 8, 1994

[51] Int. Cl.[6] ............................................. B60P 7/08
[52] U.S. Cl. ..................... 410/69; 410/77; 410/80
[58] Field of Search ................... 410/31, 33, 36, 410/69, 70, 77, 80; 280/35, 189, DIG. 8; 108/51.1, 55.1, 55.3, 55.5; 296/3

[56] References Cited

U.S. PATENT DOCUMENTS

| | | | |
|---|---|---|---|
| 2,424,429 | 7/1947 | Bamberg | 410/69 X |
| 3,693,920 | 9/1972 | Trautman | 410/77 |
| 3,934,926 | 1/1976 | Bennett | 410/80 |
| 3,993,343 | 11/1976 | Bennett | 296/3 |
| 3,993,344 | 11/1976 | Bennett | 410/36 |
| 4,121,789 | 10/1978 | Lent et al. | 410/77 |
| 4,642,007 | 2/1987 | Marshall et al. | 410/80 X |

Primary Examiner—Karen B. Merritt
Assistant Examiner—Stephen Gordon
Attorney, Agent, or Firm—Frank J. Catalano; Scott R. Zingerman

[57] ABSTRACT

A latching device secures a pallet against vertical motion relative to a truck chassis. A C-shaped bracket has its web secured to the chassis in a vertical plane transverse to the direction of motion of the tines of the fork truck used to load the pallet on the chassis. A shaft journalled through the sides of the bracket rotates axially about a horizontal axis parallel to the web. A radial arm is fixed to an extension of the shaft. A latch extending perpendicularly from the arm reciprocally angularly moves into and out of overlying abutment with a segment of the pallet being loaded onto the truck chassis. A radial paddle fixed to the shaft rotates with the shaft in response to the physical presence of one of the fork lift tines when the pallet is loaded onto the truck chassis. A pair of torsion springs are wound about the shaft, one on each side of the paddle and between the bracket sides. Each spring has one end connected to the bracket and the other end connected to the shaft, arm and paddle for biasing the shaft to a first predetermined angular position in which the latch is out of overlying abutment with the pallet segment when the tine is under the loaded pallet channel and for permitting rotation of the shaft against bias to a second predetermined angular position in which the latch is in overlying abutment with the pallet segment when the tine is not under the loaded pallet channel.

10 Claims, 6 Drawing Sheets

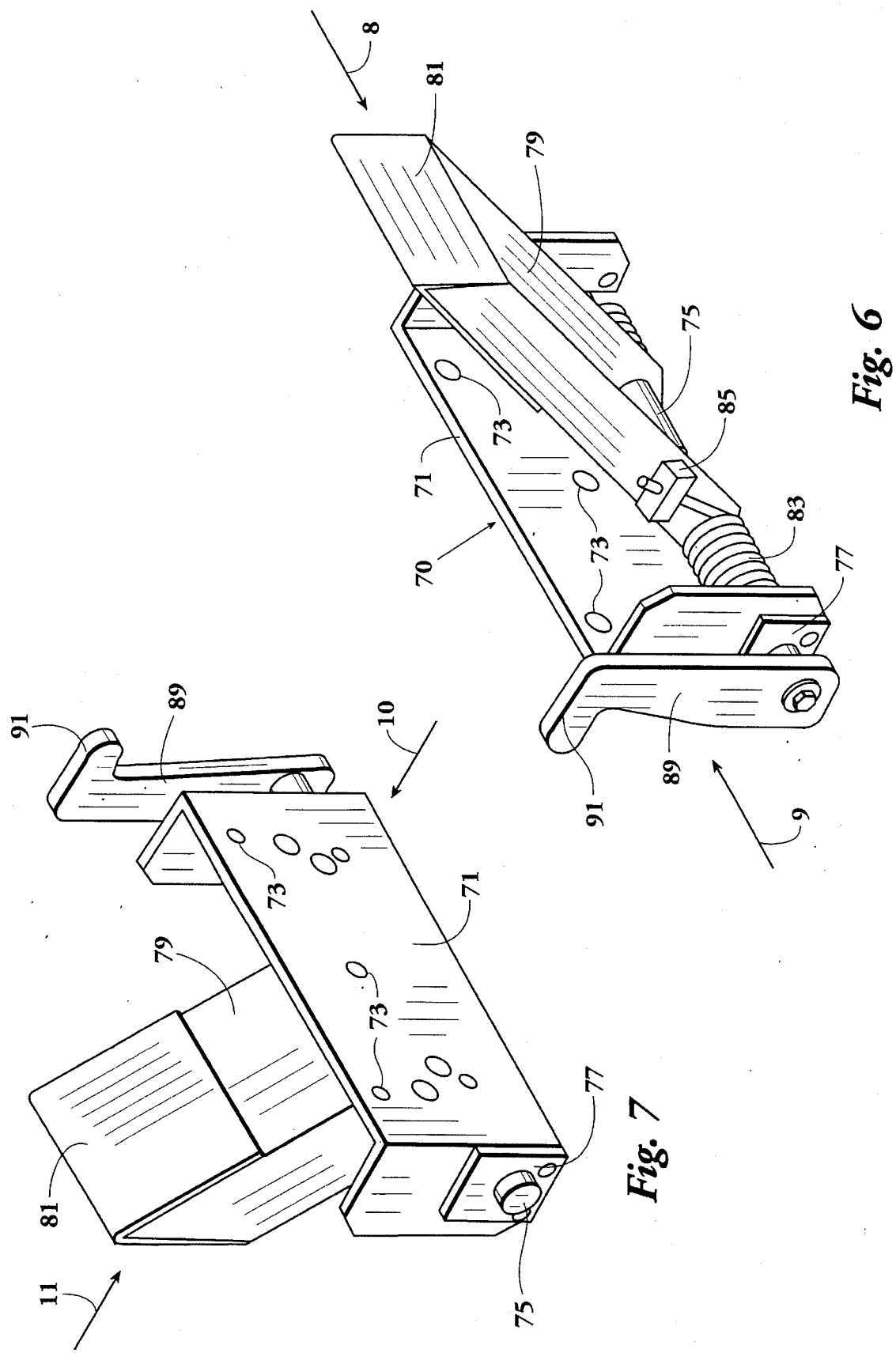

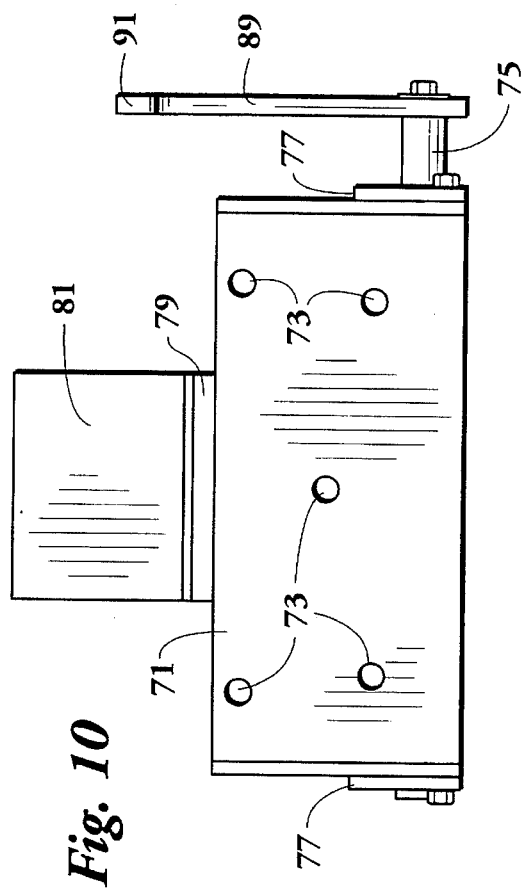
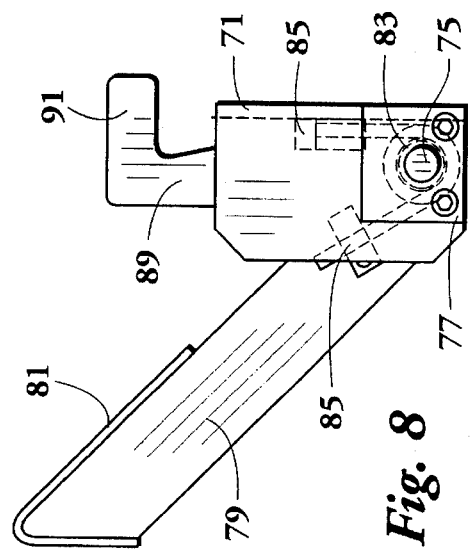
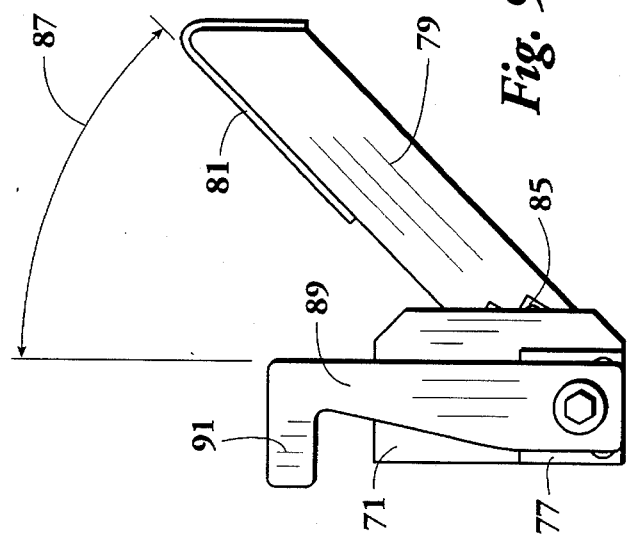
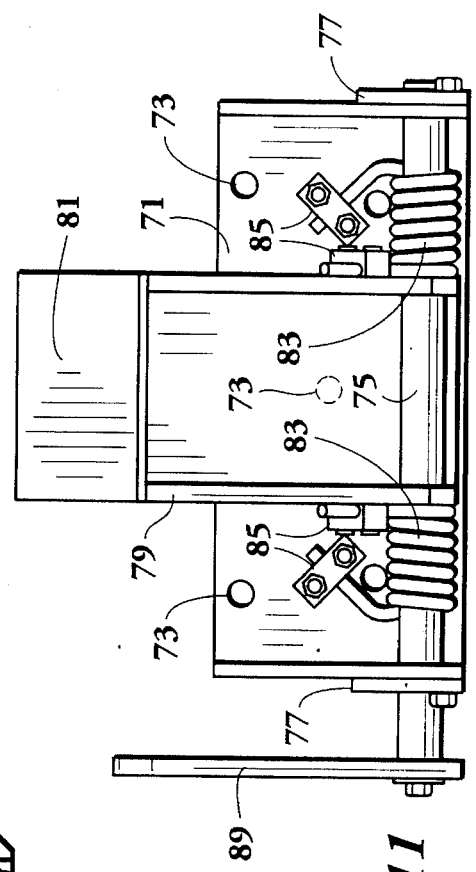
Fig. 8
Fig. 9
Fig. 10
Fig. 11

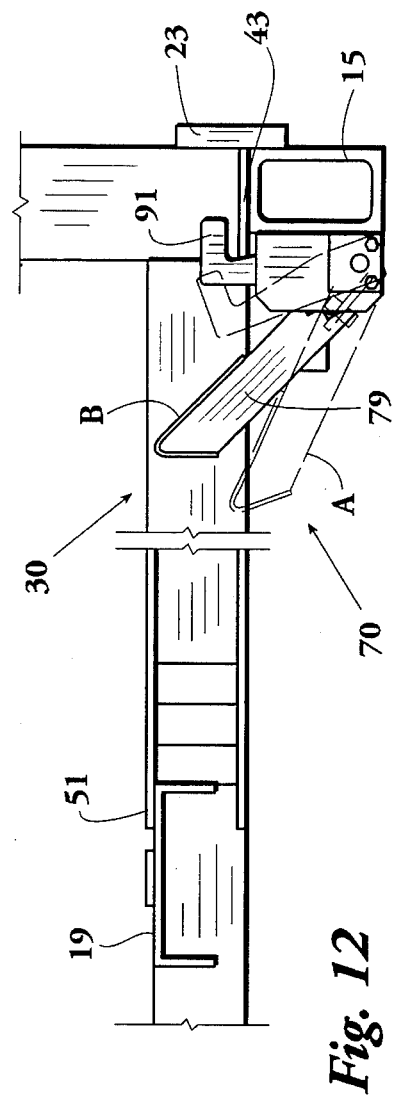
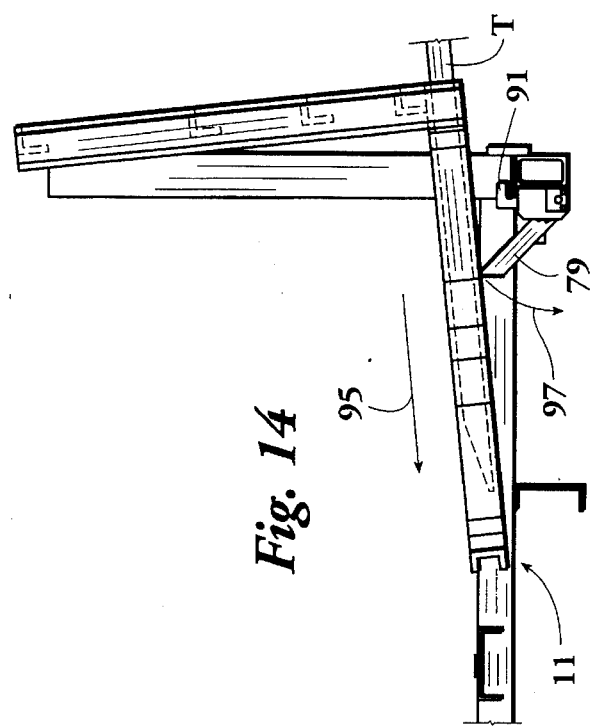
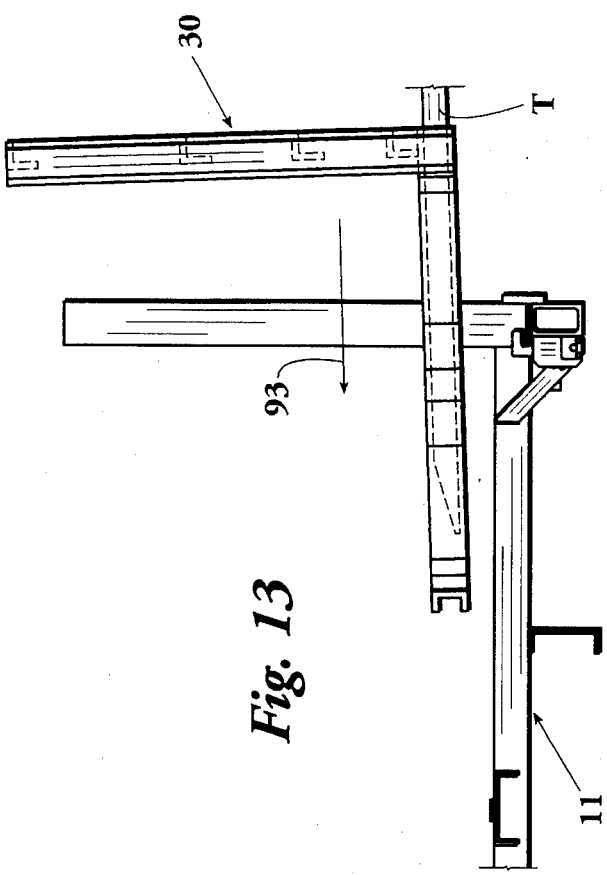

5,618,138

TRUCK PALLET LOCKING DEVICE

BACKGROUND OF THE INVENTION

This invention relates generally to palletized trucking systems and more particularly concerns locking devices for securing pallets on a truck chassis.

Truck pallet systems in which pallets mounted on a truck chassis form the truck bed are described in U.S. Pat. Nos. 3,934,926, 3,993,343 and 3,993,344 issued to Bennett.

One problem with known truck pallet systems is that the latching mechanisms used to secure the pallets to the truck chassis are mounted on the pallets. Consequently, each pallet must have at least two latching mechanisms permanently mounted on it. This tremendously increases the cost of the system.

Another problem with present latching mechanisms is that they utilize a spring-loaded horizontal pin which slides into a hole on the truck frame to prevent the pallet from moving vertically in relation to the truck frame. Accurate alignment of the pin with the hole during the fork lift pallet loading process is a difficult maneuver at best. It often is necessary to realign the pallet on the truck chassis manually with a crow bar in order to bring the pins into alignment with the holes. As a result, the pins are often bent or the latching mechanism otherwise damaged, rendering the pallet unusable until the latching mechanism can be repaired or replaced.

It is, therefore, an object of the present invention to provide a truck pallet latching device which is mountable on the truck chassis rather than on the pallet. Another object of this invention is to provide a truck pallet latching device which is functional over a greater pallet alignment tolerance range than is presently experienced. A further object of this invention is to provide a truck pallet latching device which automatically secures and releases the pallet to and from the truck chassis during mounting and dismounting thereof by a forklift.

SUMMARY OF THE INVENTION

In accordance with the invention, a latching device is provided for securing a pallet consisting of a tread plate mounted on a pair of slotted channels against vertical motion relative to a truck chassis on which the pallet is loaded by use of a fork lift having its tines inserted into the pallet channels. A C-shaped bracket has its web secured to the chassis in a vertical plane transverse to the direction of motion of the tines during loading of the pallet on the chassis. A shaft is journalled through the sides of the bracket for axial rotation about a horizontal axis parallel to the web. A radial arm is fixed to an extension of the shaft through one of the bracket sides for rotation with the shaft. A latch extends perpendicularly from the arm for reciprocal angular movement into and out of overlying abutment with a segment of the pallet, preferably a flat plate fixed between the channels, loaded onto the truck chassis. A radial paddle is fixed to the shaft at approximately the center of the bracket for rotation with the shaft in response to the physical presence of one of the fork lift tines across the slot in the pallet channel when the pallet is loaded onto the truck chassis. A pair of torsion springs are wound about the shaft, one on each side of the paddle and between the bracket sides. Each spring has one end connected to the bracket and the other end connected to the shaft, arm and paddle for biasing the shaft to a first predetermined angular position in which the latch is out of overlying abutment with the pallet segment when the tins is across the slot in the loaded pallet channel and for permitting rotation of the shaft against bias to a second predetermined angular position in which the latch is overlying abutment with the pallet segment when the tine is not across the slot in the loaded pallet channel. Preferably, the paddle extends upwardly at an angle of approximately 45 degrees, the arm extends approximately vertically and the latch extends away from the paddle when the torsion springs are in a state of equilibrium. The paddle will preferably also have a protective guard fixed on its surface which contacts the pallet channels and the tines.

BRIEF DESCRIPTION OF THE DRAWINGS

Other objects and advantages of the invention will become apparent upon reading the following detailed description and upon reference to the drawings in which:

FIG. 6 is a perspective view of a preferred embodiment of the truck pallet latching device of the present invention;

FIG. 7 is another perspective view of the device of FIG. 6;

FIG. 8 is an elevation view taken in direction 8 of FIG. 6;

FIG. 9 is an elevation view taken in direction 9 of FIG. 6;

FIG. 10 is an elevation view taken in direction 10 of FIG. 7;

FIG. 11 is an elevation view taken in direction 11 of FIG. 7;

FIG. 12 is an elevation view illustrating a pallet mounted on a truck chassis with the latching device of the present invention in the locked and unlocked conditions;

FIG. 13 is an elevation view illustrating a pallet being moved into position over a truck chassis having the latching device of the present invention mounted thereon;

FIG. 14 is an elevation view illustrating the pallet of FIG. 13 being loaded onto the truck chassis of FIG. 13;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
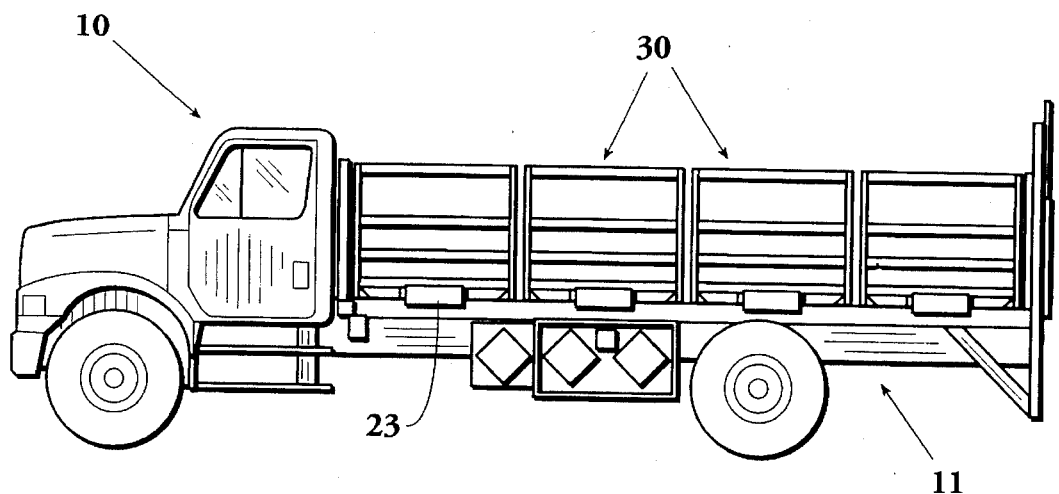
FIG. 1 is a side elevation view of a truck having pallets secured on its chassis by the latching devices of the present invention.
Figure 2:
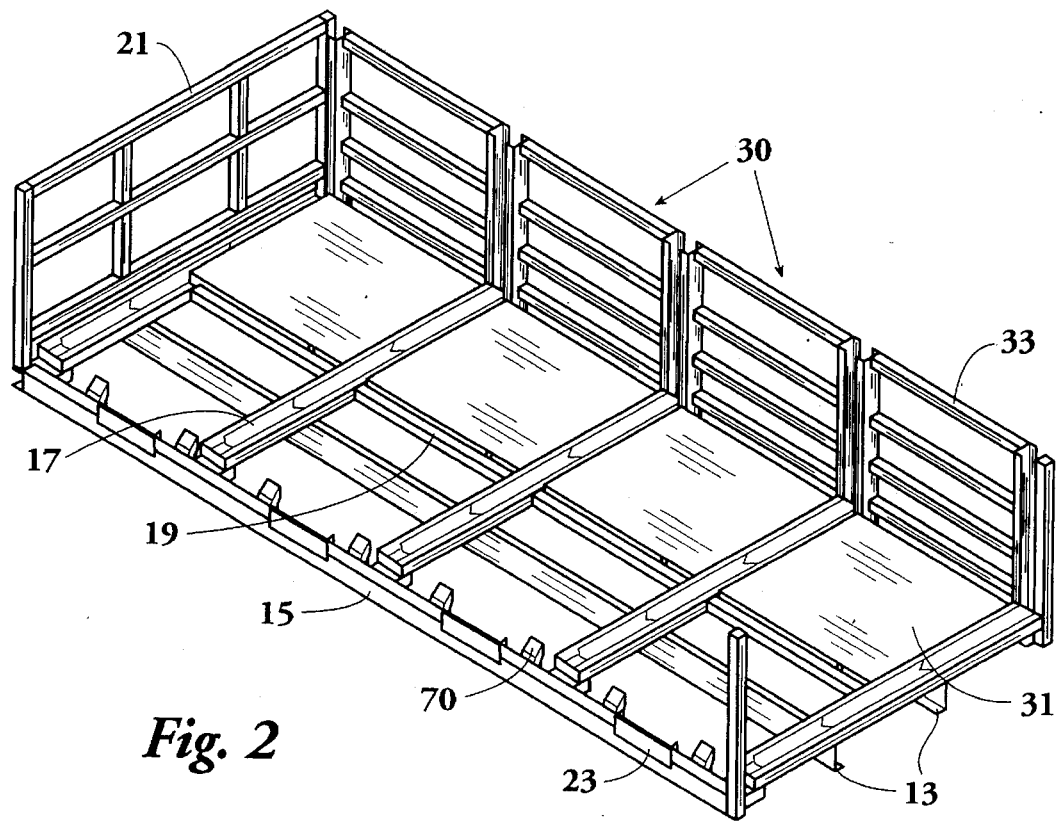
FIG. 2 is a perspective view illustrating the latching devices of the present invention mounted on the chassis of the truck of FIG. 1.

Turning first to FIGS. 1 and 2, a typical truck 10 having a chassis 11 capable of supporting eight pallets 30 in four by two arrangement is illustrated having main channels 13, side channels 15, cross channels 17 mounted over the main channels 13 and extending between the side channels 15 and center channels 19 transverse to and connecting the cross channels 17 at their centers. A front rail 21 may also extend across the chassis 11 forward of the forward most cross rail 17. Lock plates 23 are added to the chassis 11 for use with the present invention. Each pallet 30 consists of a base portion 31 and a side rail 33.

Figure 4:
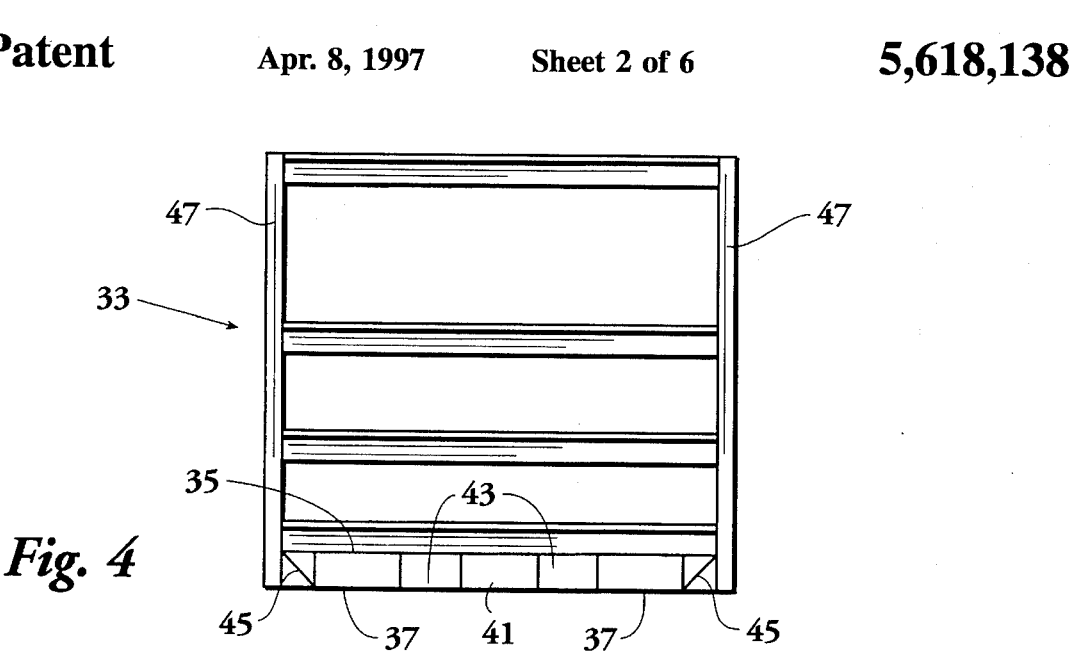
FIG. 4 is a side elevation view of the pallet of FIG. 3.
Figure 3:
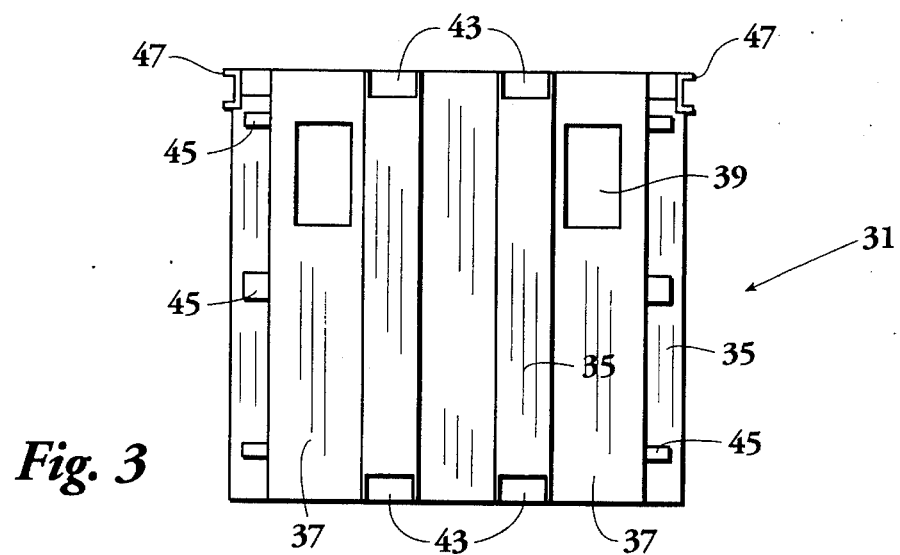
FIG. 3 is a bottom plan view of a preferred embodiment of a pallet for use with the latching devices of the present invention.
Figure 5:
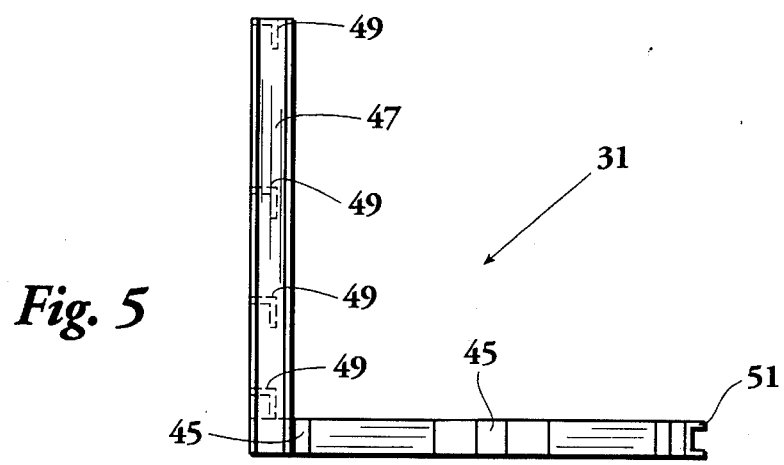
FIG. 5 is a front elevation view of the pallet of FIG. 3.

A pallet 30 specially adapted for use with the latching device 70 of the present invention is illustrated in FIGS. 3, 4 and 5. The base 31 of the pallet 30 consists of a tread plate 35 with a pair of fork channels 37 welded orthogonally across the pallet 30 under the tread plate 35. The bottom surface of each of the fork channels 37 has a substantially rectangular slot 39, the positioning of which will hereinafter be apparent. A center channel 41 is welded to the tread plate 35 between the fork channels 37 and substantially along the center line of the pallet 30. As shown, the fork channels 37 and the center channel 41 are spaced apart and flats 43 are welded between each fork channel 37 and the center channel 41 at the sides of the pallet 30 and in a plane substantially the same as the plane of the bottom faces of the fork channels 37 and center channel 41. Tapered tabs 45 welded to the outside walls of the fork channels 37 facilitate guiding of the base 31 of the pallet 30 into position between the cross channels 17 of the truck chassis 11. Upright channels 47 and horizontal angle irons 49 form the side rail 33 of the pallet 30. A channel 51 extends across the leading edge of the base 31 of the pallet 30 opposite the side rail 33.

A preferred embodiment of the latching device 70 for locking the pallet 30 in place on the truck chassis 11 is illustrated in FIGS. 6 through 11. As shown, the latching device 70 includes a C-shaped or channel mounting bracket 71 having a plurality of holes 73 through its web for mounting the latching device 70 on the truck chassis 11 by bolts (not shown). A shaft 75 extends through the side portions of the bracket 71 and is journalled for axial rotation in shaft clamps 77 screwed to the bracket 71 forming bronze bushings for the shaft 75. A radial crank arm or paddle 79 is rigidly fixed at one end to the shaft 75 between the side portions of the bracket 71 for rotation with the shaft 75. Preferably, the latch arm is a segment of channel having a free end cut at an angle of approximately 45°. The top and leading faces of the paddle 79 are protected by a high tensile steel guard 81 welded to the paddle 79. A pair of torsion springs 83 helically disposed around the shaft 75, one between each side portion of the bracket 71 and the paddle 79, are secured at their ends by spring clamps 85, one end to the mounting bracket 71 and the other to the paddle 79. Under the normal bias or equilibrium position of the torsion springs 83, the paddle is maintained at a predetermined angle 87 preferably approximately 45°, upwardly and away from the web of the mounting bracket 71. One end of the shaft 75 extends beyond its shaft clamp 77 and a radial arm 89 is fixed proximate this extending end of the shaft 75 for rotation therewith in unison with the paddle 79. As shown, the arm 89, under the normal bias or equilibrium position of the torsion springs 83, extends preferably upwardly from the shaft to a latch 91 which extends horizontally from the arm 89 in a direction toward the web of the bucket 71 opposite to the extension of the paddle 79 from the shaft 75.

Figure 15:
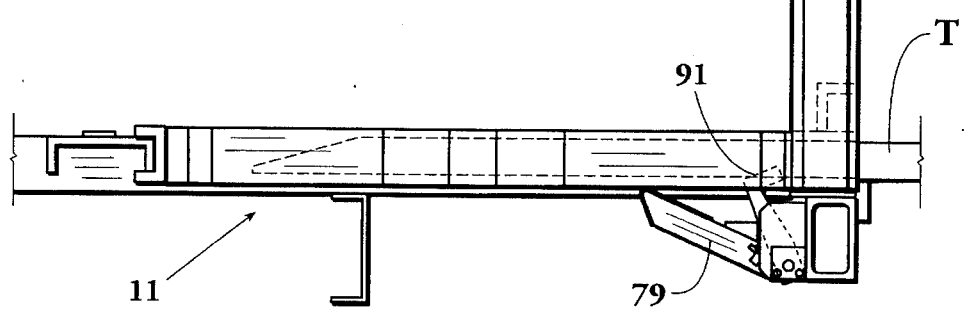
FIG. 15 is an elevation view illustrating the pallet of FIG. 13 fully loaded onto the truck chassis of FIG. 13 with the latching device in the unlocked condition.
Figure 16:
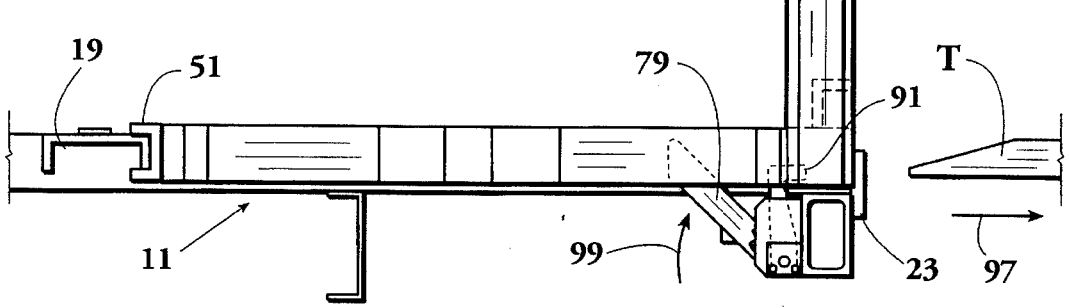
FIG. 16 is an elevation view illustrating the pallet of FIG. 13 fully loaded on the truck chassis of FIG. 13 with the latching device in the locked condition.

Turning now to FIGS. 12 through 16, the operation of the latching device 70 can be understood. In FIG. 12, the pallet 30 is shown in a fully loaded condition onto the truck chassis The key components of the truck chassis relative to the pallet 30 are the center channel 19, the side channel 15 and the locking plate 23 which is welded to the outside wall of the side channel and extends above and along the edge of the side channel 15 as can also be seen in FIGS. 1 and 2. When the pallet 30 is fully loaded onto the truck chassis 11, the leading edge channel 51 of the pallet base 31 receives the truck center channel 19 so that the truck center channel 19 supports the pallet 30 in a vertical direction and prevents its lateral motion toward the center of the truck. The fork channels 37 of the pallet 30 are seated on the side channel 15 of the truck with the locking plate 23 preventing lateral motion of the pallet 30 away from the center of the truck. The latching device 70 is bolted with its web on the inside face of the truck side channel 15 so that the paddle 79 extends upwardly and inwardly toward the center of the truck when the torsion springs 83 are in their normal condition. They are positioned so that the flats 43 align with the latch 91 when the pallet 30 is loaded onto the truck chassis 11. The flats 43 on the pallet 30 between the fork channels 37 and the center channel 41 of the pallet 30 are seated atop the truck side channel 15. When the latching device 70 is in its unlocked condition A shown in dotted lines, the latch 91 is tilted away from its respective flat 43 so that the pallet 30 is free to move vertically in relation to the truck side channels 15. However, when the paddle 79 is in its locked condition B, the latch 91 is rotated to overlap its respective flat 43, thus securing the pallet 30 against vertical movement in relation to the truck side channel 15. Looking at FIG. 13, the pallet 30 is being moved into position over the truck chassis 11 by the tines T of a fork lift (not shown) in the direction generally indicated by the arrow 93. In FIG. 14, as the pallet 30 comes more fully into position over the truck chassis the pallet 30 is dropped downwardly at its leading edge as it continues to be moved inwardly toward the center of the truck in the direction generally indicated by the arrow 95. As the bottom surface of the fork channels 37 and the tines T, to the extent they are exposed by the rectangular slots 39 in the fork channels 37, come into contact with the upper end of the paddle 79, they cause the paddle 79 to rotate downwardly about the latching device shaft 75 in the direction indicated by the arrow 97, thus causing the latch 91 to rotate away from the truck side channel 15 and allowing the pallet flat 43 to drop into abutment with the truck side channel 15. As shown in FIG. 15, when the pallet 30 is fully loaded onto the truck chassis 11, the paddle 79 and the latch 91 are in their maximum rotated condition with the top end of the paddle 79 abutting the fork tine T and the springs 83 at their maximum bias. Then, as shown in FIG. 16, as the tines T are withdrawn in the general direction of the arm 97 from the truck and pallet 30, the paddle 79 is free to rotate under the bias of the springs 83 upwardly as indicated by the arrow 99 into the rectangular slot 39 in the fork channel 37. This brings the latch 91 into its locked condition above the flat 43.

Once in the locked condition illustrated in FIG. 16, the pallet leading edge channel 51 cooperates with the truck center channel 19 and the latch 91 cooperates with the flat 43 to secure the pallet 30 against vertical motion in relation to the truck chassis 11. In addition, the truck center channel 19 and the locking plate 23 prevent lateral motion of the pallet 30 in relation to the truck.

The shaft 75 could be biased to its equilibrium point in a variety of ways, such as by leaf springs or coil springs. The relative angular position of the arm 89 and the paddle 79 on the shaft 75 can also be varied depending on the desired configuration of the fork channels 37 and the pallet flats 43.

Thus, it is apparent that there has been provided, in accordance with the invention, a truck pallet locking device that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For securing a pallet having a tread plate mounted on a frame against vertical motion relative to a truck chassis on which the pallet is loaded, a latching device comprising:

a bracket mountable on the truck chassis;

a rotatable assembly comprising:
   a shaft journalled for axial rotation on said bracket;
   a radial arm fixed to an extension of said shaft beyond said bracket for rotation therewith and having a latch protruding therefrom for reciprocal angular movement into and out of overlying abutment with a segment of a pallet loaded onto the truck chassis and
   a radial paddle fixed to said shaft for rotation therewith in response to the physical presence and absence of a fork lift tine under the tread plate of the pallet; and means operably connected between said bracket and said rotatable assembly for biasing said rotatable assembly to a first predetermined angular position in which said latch is in overlying abutment with the pallet segment when the tine is not under the tread plate of the pallet and for permitting rotation of said rotatable assembly against said bias to a second predetermined angular position in which said latch is out of overlying abutment with the pallet segment when the tine is under the tread plate of the pallet.

2. A device according to claim 1, said bracket comprising a central web and side walls extending outwardly therefrom, said shaft being journalled through said side walls.

3. A device according to claim 2, said radial arm and said latch being of integral L-shaped configuration.

4. A device according to claim 2, said paddle being approximately centered between said bracket side walls.

5. A device according to claim 1, said biasing and permitting means comprising at least one torsion spring wound about said shaft.

6. For securing a pallet having a tread plate mounted on a frame with horizontal slots therein against vertical motion relative to a truck chassis on which the pallet is loaded, a latching device comprising:

a bracket mountable on the truck chassis;

a rotatable assembly comprising:
   a shaft journalled for axial rotation on said bracket;
   a radial arm fixed to an extension of said shaft beyond said bracket for rotation therewith and having a latch protruding therefrom for reciprocal angular movement into and out of overlying abutment with a segment of a pallet loaded onto the truck chassis; and
   a radial paddle fixed to said shaft for rotation through a horizontal slot in the tread plate frame in response to the physical presence and absence of a fork lift tine under the tread plate of the pallet being loaded onto the truck chassis; and means connected between said bracket and said rotatable assembly for biasing said assembly toward a latched condition in which said latch is in overlying abutment with the pallet segment when removal of the tine permits penetration of said paddle into the slot in the tread plate of the pallet and for permitting said assembly to rotate against said bias to an unlatched condition in which said latch is out of overlying abutment with the pallet segment when the tine prevents penetration of said paddle into the slot in the tread plate of the pallet.

7. For securing a pallet having a tread plate mounted on a pair of channels having slots therein against vertical motion relative to a truck chassis on which the pallet is loaded by use of a fork lift having tines inserted into the pallet channels, a latching device comprising:

a C-shaped bracket having a web securable to the chassis in a vertical plane transverse to the direction of motion of the tines during loading of the pallet on the chassis;

a rotatable assembly comprising:
   a shaft journalled through sides of said bracket for axial rotation about a horizontal axis parallel to said web;
   a radial arm fixed to an extension of said shaft through one of said bracket sides for rotation with said shaft and having a latch extending therefrom in a direction perpendicular thereto for reciprocal angular movement into and out of overlying abutment with a segment of a pallet loaded onto the truck chassis; and
   a radial paddle fixed to said shaft at approximately the center of said bracket for rotation therewith in response to the physical presence and absence of a fork lift tine across a slot in a pallet channel of the pallet; and a pair of torsion springs wound about said shaft, one on each side of said paddle and between said bracket sides, each said spring having one end connected to said bracket and another end connected to said rotatable assembly for biasing said rotatable assembly to a first predetermined angular position, in which said latch is in overlying abutment with the pallet segment when the tine is not across the slot in the pallet channel and for permitting rotation of said rotatable assembly against said bias to a second predetermined angular position, in which said latch is out of overlying abutment with the pallet segment when the tine is across the slot in the pallet channel.

8. A device according to claim 7, said paddle extending upwardly at an angle of approximately 45 degrees, said arm extending approximately vertically and said latch extending away from said paddle when said torsion springs are in a state of equilibrium.

9. A device according to claim 8, said pallet segments comprising a flat plate fixed between said channels.

10. A device according to claim 9, said paddle having a protective guard fixed on a surface thereof.

* * * * *